United States Patent [19]

Laughlin et al.

[11] Patent Number: 4,912,810
[45] Date of Patent: Apr. 3, 1990

[54] METHOD AND APPARATUS FOR PEELING CRUSTACEANS

[75] Inventors: Thomas J. Laughlin, Germantown, Tenn.; Donald R. Cowsar, Birmingham, Ala.

[73] Assignee: Duzitall Equipment Corporation, Baton Rouge, La.

[21] Appl. No.: 184,626

[22] Filed: Apr. 22, 1988

[51] Int. Cl.$^4$ .............................................. D01B 1/04
[52] U.S. Cl. .............................................. 17/48; 17/73
[58] Field of Search .............................. 17/48, 73, 71

[56] References Cited

U.S. PATENT DOCUMENTS

| | | | |
|---|---|---|---|
| 2,501,655 | 3/1950 | Altenburg | 99/195 |
| 2,600,867 | 6/1952 | Gerritsen | 241/14 |
| 2,660,754 | 12/1953 | Roshko | 17/2 |
| 2,978,334 | 4/1961 | Lapeyre | 99/111 |
| 2,987,759 | 6/1961 | LaPeyre et al. | 17/2 |
| 3,084,379 | 4/1963 | Henning | 17/45 |
| 3,220,049 | 11/1965 | Martin | 17/2 |
| 3,221,362 | 1/1963 | Couret | 17/45 |
| 3,221,363 | 1/1963 | Couret | 17/45 |
| 3,222,186 | 12/1965 | D'Aquin | 99/111 |
| 3,278,983 | 10/1966 | Martin | 17/45 |
| 3,324,504 | 6/1967 | Lapeyre | 17/48 |
| 3,346,395 | 10/1967 | D'Aquin | 99/111 |
| 3,471,894 | 10/1969 | Tasker | 17/48 |
| 3,601,095 | 8/1971 | Olson | 119/2 |
| 3,705,040 | 12/1972 | Bynagte | 99/111 |
| 3,758,921 | 9/1973 | Ingalls | 17/71 |
| 3,789,460 | 2/1974 | Ingalls | 17/73 |
| 3,812,271 | 5/1974 | Lapeyre | 426/212 |
| 3,852,500 | 12/1974 | Heumann, Jr. et al. | 426/151 |
| 3,855,668 | 12/1974 | Wenstrom | 17/71 |
| 3,862,122 | 1/1975 | Peniston et al. | 260/211 R |
| 4,008,508 | 2/1977 | LaPine et al. | 17/52 |
| 4,053,964 | 10/1977 | Rutledge | 17/48 |
| 4,087,887 | 5/1978 | Hoffman et al. | 17/73 |
| 4,121,322 | 10/1978 | Rutledge | 17/73 |
| 4,133,077 | 1/1979 | Jasniewicz et al. | 17/48 |
| 4,196,495 | 4/1980 | Mestayer et al. | 17/73 |
| 4,199,496 | 4/1980 | Peniston et al. | 260/112 R |
| 4,206,236 | 6/1980 | Orth, Jr. | 426/1 |
| 4,307,492 | 12/1981 | Braginsky et al. | 17/71 |
| 4,385,422 | 5/1983 | Ingalls et al. | 17/73 |
| 4,387,485 | 6/1983 | Grinberg et al. | 17/48 |
| 4,505,936 | 3/1985 | Meyers et al. | 426/1 |
| 4,524,490 | 6/1985 | Newville | 17/48 |

OTHER PUBLICATIONS

"Johnsson Shrimp Peeling Machines Sales Brochure".
"Johnsson Shrimp Peeling Machines Sales Brochure, Model 33TR".
"South by Design".

Primary Examiner—Willis Little
Attorney, Agent, or Firm—Needle & Rosenberg

[57] ABSTRACT

A method and an apparatus for mechanically removing the meat from a crustacean is provided, which include the steps of loading the tail of the crustacean onto guide means, extending the tail so that it assumes a substantially horizontal position, piercing the tail with the tip of a nozzle connected to a source of pressurized fluid, separating the head and abdominal portions of the crustacean from the tail, and expelling the meat from the tail by means of the pressurized fluid from the nozzle tip impinging on the meat.

26 Claims, 8 Drawing Sheets

METHOD AND APPARATUS FOR PEELING CRUSTACEANS

BACKGROUND OF THE INVENTION

The present invention relates to the food processing industry, and more particularly to a method and device for mechanically removing meat from a crustacean.

Crustaceans, and particularly crawfish, are a popular foodstuff. For example, it is estimated that seventy-million pounds of crawfish a year are processed in Louisiana alone. While this amount may be impressive, there still exists a much larger, yet unfulfilled, market for crawfish meat. This is primarily due to the inability of the presently known methods of processing crawfish to meet the demand. For example, the majority of the processing of crawfish is still performed by hand. Such manual labor is both slow and expensive. The same is true for processing other types of crustaceans, such as small lobsters and rock shrimp.

There exists, therefore, a need for a method and device for mechanically processing a crustacean which is commercially viable. Such a device should rapidly peel a crawfish while requiring a minimum number of operators, and should be simple and safe enough to be operated by someone with limited technical skills. Such a device should accomodate a wide size range of crawfish while deveining efficiency and removing the meat intact from the shell with high efficiency. Furthermore, the device should meet USDA standards for food processors and have easily replaceable parts.

SUMMARY OF THE INVENTION

According to the present invention, the device for processing crustaceans, and particularly crawfish, has a circular plate rotatably mounted on a housing. Means for rotating the plate are also provided.

Guide means, preferably comprised of a rigid, V-shaped element, are provided on the plate. The V-shaped element is designed to receive a crawfish tail-first in a dorsal side down position. A nozzle connected to a source of pressurized fluid is also provided. The nozzle has a sharpened tip which projects into the guide means, preferably extending upwardly from the bottom of the V-shaped element and at an angle of approximately 30° to approximately 45° from the upper surface of the plate.

Means for uncurling the tail of the crawfish so that the tail assumes an extended position is also provided. The uncurling means preferably comprises an air cylinder having a brush on its piston end. The brush has downwardly extending bristles for engaging the tail opposite the dorsal side. Means for applying a downward pressure to the extended tail so that the nozzle tip pierces the tail are also provided. Separating means comprising a stationary element in the path of travel of the crawfish and plate are provided for engaging the crawfish so as to sever its body portion from its tail as the plate is rotated.

In operation, the crawfish is presented to a guide means on the rotating plate, where the tail is uncurled by the brush of the uncurling means. The dorsal side of the tail is then pierced with the nozzle tip while downwardly directed pressure is applied to the tail opposite the dorsal side to urge the dorsal side upon the tip. As the plate is rotated, the separating means engages the head and abdominal portion of the crawfish and removes both these portions from the tail. The meat is then expelled from the tail by means of pressurized fluid from the tip impinging on the meat. The tail is then ejected from the guide means after the expelling step.

Other objects, advantages and novel features of the present invention will become apparent from the following detailed description of the invention when considered in conjunction with the accompanying drawings.

DETAILED DESCRIPTION OF THE PREFERRED EMBODIMENT

Referring now to the figures, a preferred embodiment of the peeling device 2 of the present invention can be discussed in terms of four basic sections: the table-top components, the internal air controls, the drive train, and the housing. These features are described individually herein.

Figure 1:
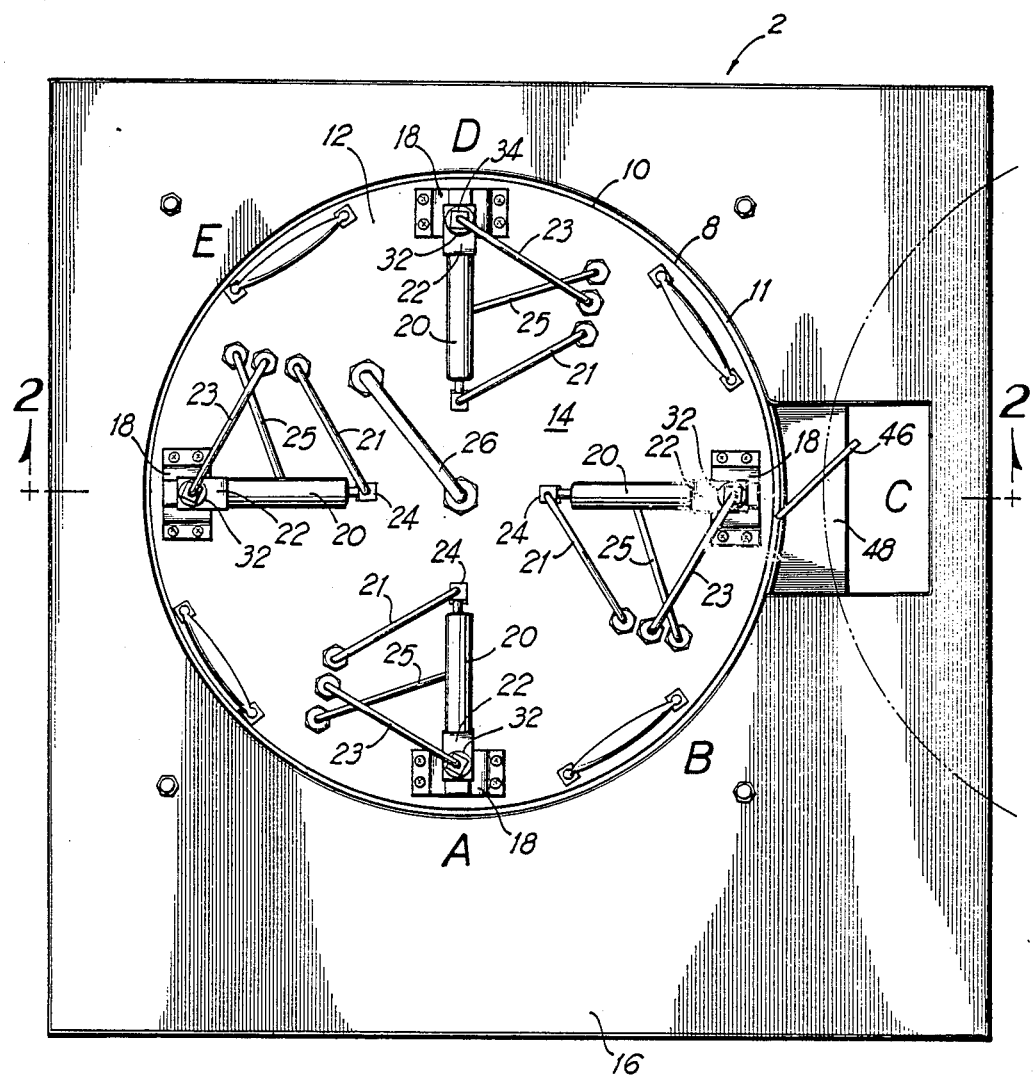
FIG. 1 is a top perspective view of the crustacean peeling device of the present invention.
Figure 2:
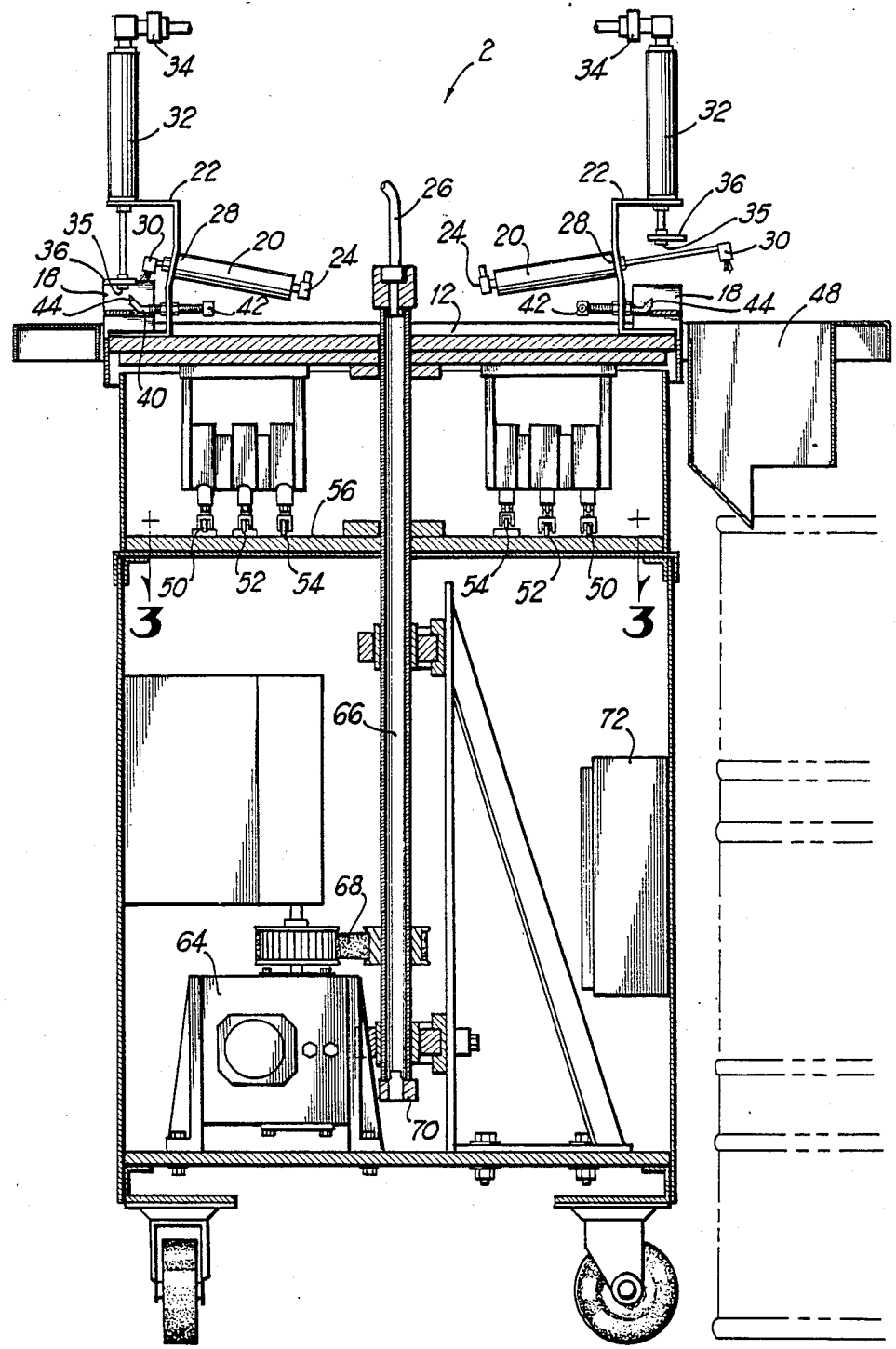
FIG. 2 is cross-sectional view of the crustacean peeling device of the present invention taken along lines of FIG. 1.

Referring to FIGS. 1 and 2, a housing 8 is cylindrical in shape and has a top periphery 10. A flange surface 11 extends about the top periphery 10. A circular plate 12, acting as support means for the components used in the peeling process, is rotatably mounted on the housing 8. A stationary table 16 surrounds the housing 8.

The device 2 has four substantially similar sets of components spaced at 90° intervals on the plate 12. Guide means 18 are provided on the plate 12 for receiving the crawfish. It is preferable that the guide means 18 be in the form of a rigid, approximately 85°, V-shaped element capable of accepting and centering a crawfish tail side first and dorsal side down. Also provided are means for uncurling the tail of the crawfish once it is placed in the guide means 18. The uncurling means has a first air cylinder 20 held by a fastener 22 in a horizontal position substantially parallel to the plate 12. The first air cylinder 20 is connected at its rear end 24 to a pressurized fluid source 2 through line 21 at its forward piston end 28 to a brush 30 having bristles 80. The brush 30 is positioned on the piston end of the air cylinder 20, and as a result is capable of being extended from a position adjacent the guide means 18 outwardly away from the center of the plate 12 and towards the table 16, and then retracting back towards and over the length of the guide means 18. This uncurling action is described in more detail below, under "Operation."

Also provided on the plate 12 are means for applying downward pressure to the tail of the crawfish once it is uncurled. Such means are comprised of a second air cylinder 32 held in vertical position above the guide means 18 by the fastener 22. The rear end 34 of the second air cylinder is receivably connected to a source of the pressurized fluid 26 through line 23. The forward piston end of the second air cylinder 32 has attached a block 36 which acts as a guide for the crawfish located in the guide means 18 when the second air cylinder 32 is activated. A foot 35 is located on the bottom of the block 36, and contacts and holds the crawfish in the centered position.

Figure 4:
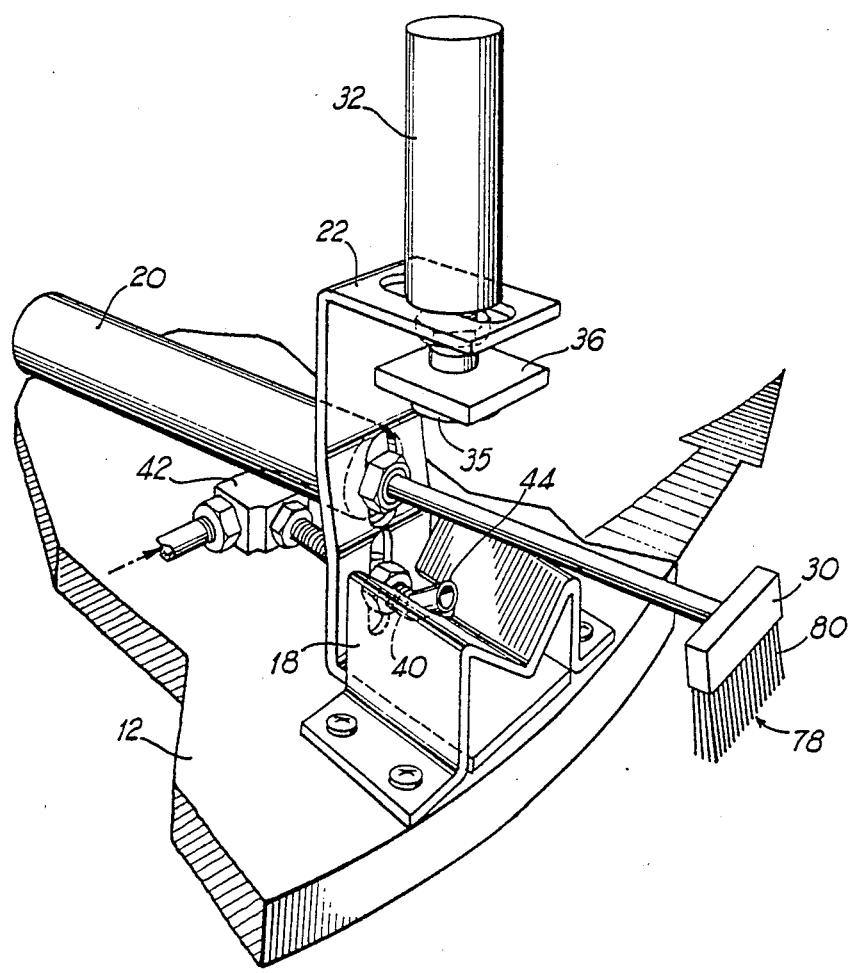
FIG. 4 is a side perspective view of an embodiment of the set of components of the crustacean peeling device of the present invention.
Figure 12:
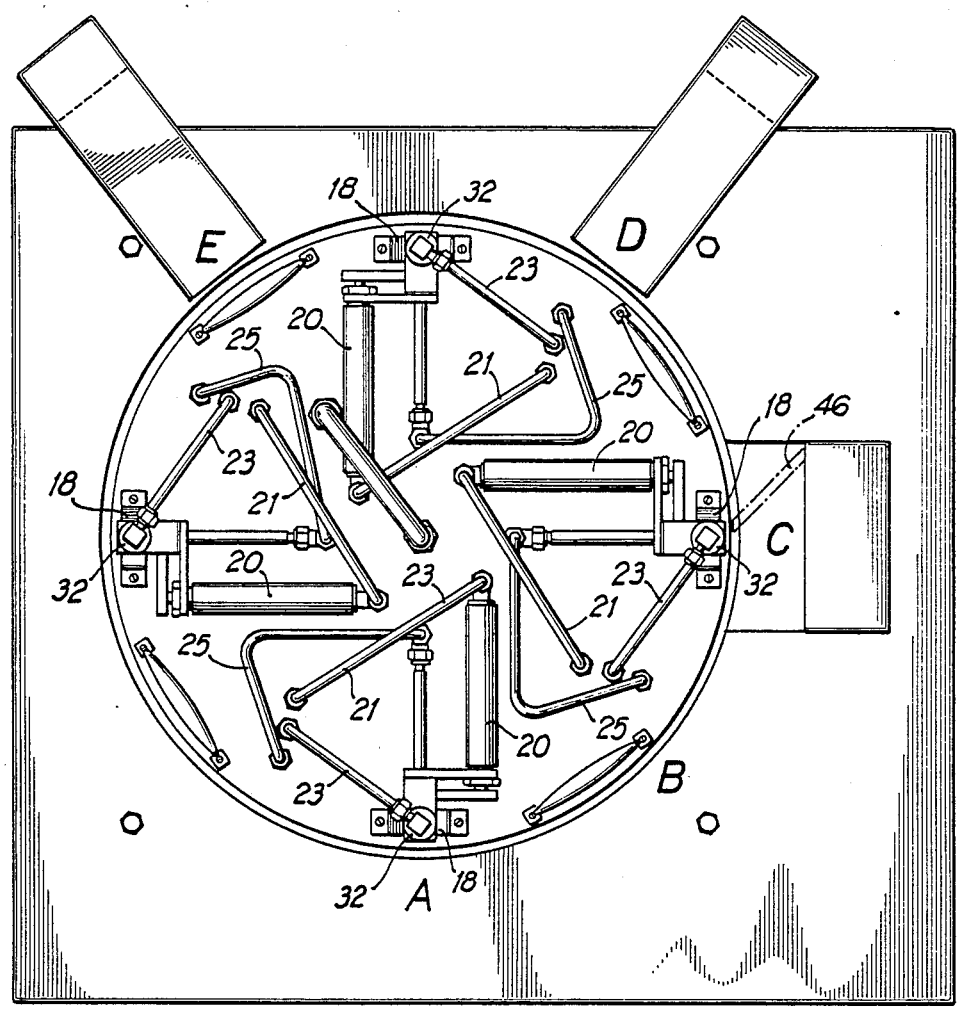
FIG. 12 is a top perspective view of a second embodiment of the crustacean peeling device of the present invention.

FIGS. 4 and 12 illustrate a second, more complicated embodiment of one set of the components of the invention. In this embodiment, the first air cylinder 20 of the uncurling means is positioned slightly (i.e. approximately 2 inches) to one side of the guide means 18 and the pressure applying means as opposed to directly behind those means as shown in the remaining figures. Also, to compensate for such positioning, a wider brush 30 having extended angularly facing bristles 80 must be used so that the bristles 80 still contact and pull back the tail of the crawfish positioned on the guide means 18. By utilizing this second embodiment, the loading area between the block 36 and the guide means 18 is less cluttered, and the loading procedure is made easier. Also, there is less chance that the block 36 will accidentally contact the piston or brush 30 since neither pass directly beneath the block 36 during operation. However, either embodiment can be used.

Nozzle means for ejecting meat from the crawfish by pressurized fluid are also provided on the plate 12. Such means are comprised of a nozzle 40 located on the plate 12 at a point adjacent to the guide means 18. The nozzle 40 has a rear end 42 facing the center of the plate 12. The rear end 42 is receivably connected to a source of pressurized fluid 26 through line 25. A sharpened nozzle tip 44 is located at the front end of the nozzle 40 and projects into the guide means 18. It is preferable that the nozzle tip 44 extend from the bottom of the V-shaped element of the guide means 18 at angle of approximately 30° to approximately 45° from the upper surface of the plate 12.

Also provided, as seen in FIG. 1, are means for separating the body portion of the crawfish from its tail. Such means are preferably comprised of a stationary element 46 in the path of travel of said plate 12 so as to engage the body portion of the crawfish as the plate 12 rotates. The element 46 is preferably a metal bar about 30° relative to the horizon, and is located above a receiving trap 48 for receiving the head and abdominal portion of the crawfish once these portions are severed.

Figure 3:
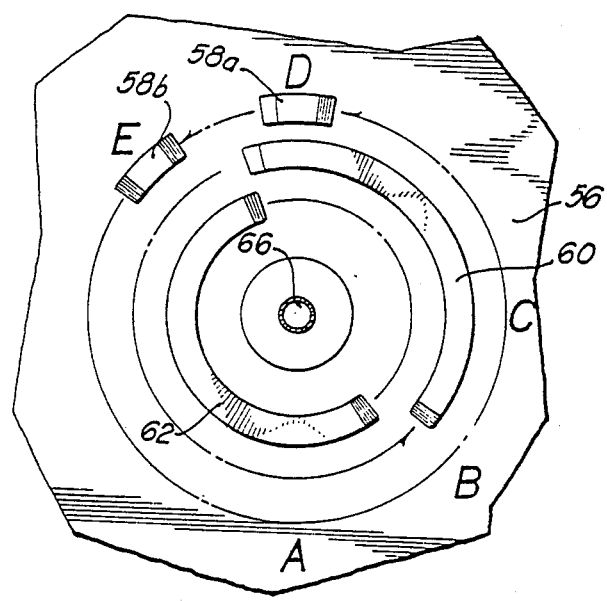
FIG. 3 is a top perspective view of the timing surface of the crustacean peeling device of the present invention.

The primary fluid-control system for providing fluid to the uncurling means, the pressure means, and the nozzle means is comprised of a set of three spool valves 50, 52 and 54. Each spool valve 52, 54 and 56 has an associated independent valve for controlling the amount of fluid it delivers. Fluid, preferably clean, oil-free air, is delivered to the meat-ejection nozzle 40 when the first spool valve 50 is triggered by first triggering means 58a of the timing surface 56, as seen in FIG. 3. Fluid is also delivered to the nozzle 40 when the first valve 50 meets the subsequent first triggering means 58b. Fluid is delivered to the second air cylinder 32 of the means for applying downward pressure when the second spool valve 52 is triggered by second triggering means 60 of the timing surface 56. Fluid is delivered to the first air-cylinder 20 of the uncurling means when the third spool valve 54 is triggered by third triggering means 62 of the timing surface 56. The positioning of the triggering means 58, 60 and 62 controls when the fluid is delivered to the various means, and therefore controls the operations performed by the means. Of course, the distributions of the fluid may be accomplished in other ways, including electrical or mechanical.

The drive train for rotating the plate 12 may be of any workable design. One such design, as seen in FIG. 2 comprises an electric motor 64 connected to a vertically extending drive shaft 66 by belt and idle arm means 68. A rotary union 70 is attached to the lower end of the drive shaft 66 for attachment to an outside fluid-line (not shown) for delivering fluid to the nozzle means, the uncurling means, and the pressure means. The plate 12 is attached to and rotated by the drive shaft 66.

The motor 64 is controlled by a controller box 72 located inside the device 2. The speed of rotation of the plate 12 can be varied as desired. The device 2 may also be turned on and off by a foot pedal (not shown) so that the operator has both hands free during operation.

OPERATION

The operation of the device 2 of the present invention can be envisioned as five major functions: loading, clamping, deheading, meat ejection, and shell ejection.

The loading function occurs at the center of the section we will term station A, or the 0° point, as seen in FIG. 1. The loading function can itself be broken into several steps: opening the tail, centering the tail, piercing the tail by the nozzle tip 44, and holding the tail in the required position for the remaining functions.

Figure 6:
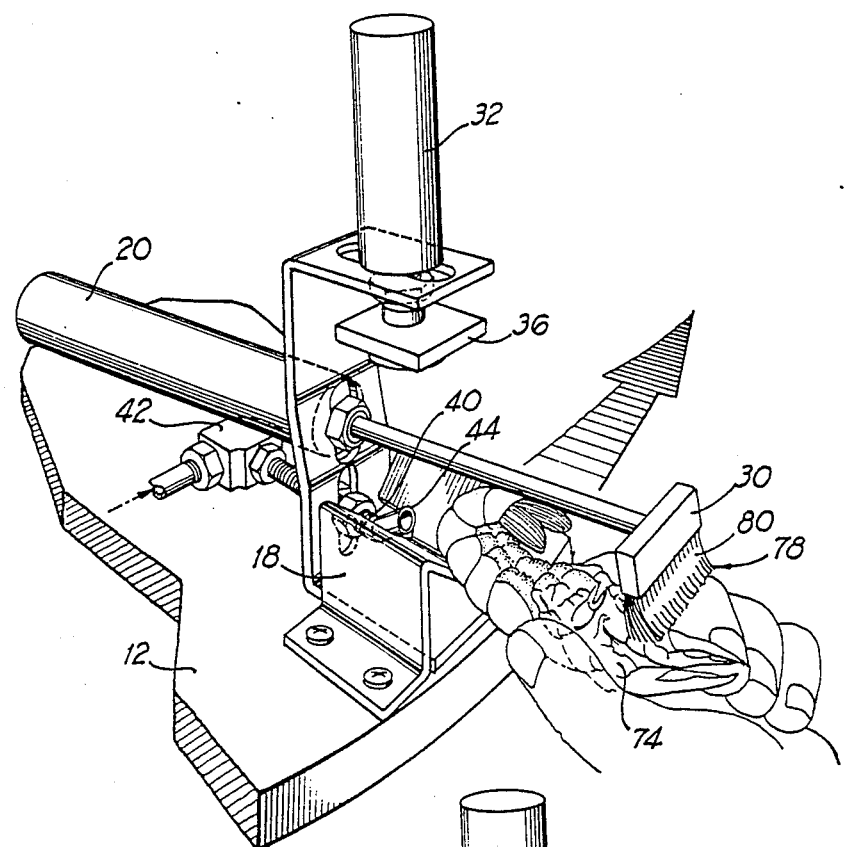
Figure 7:
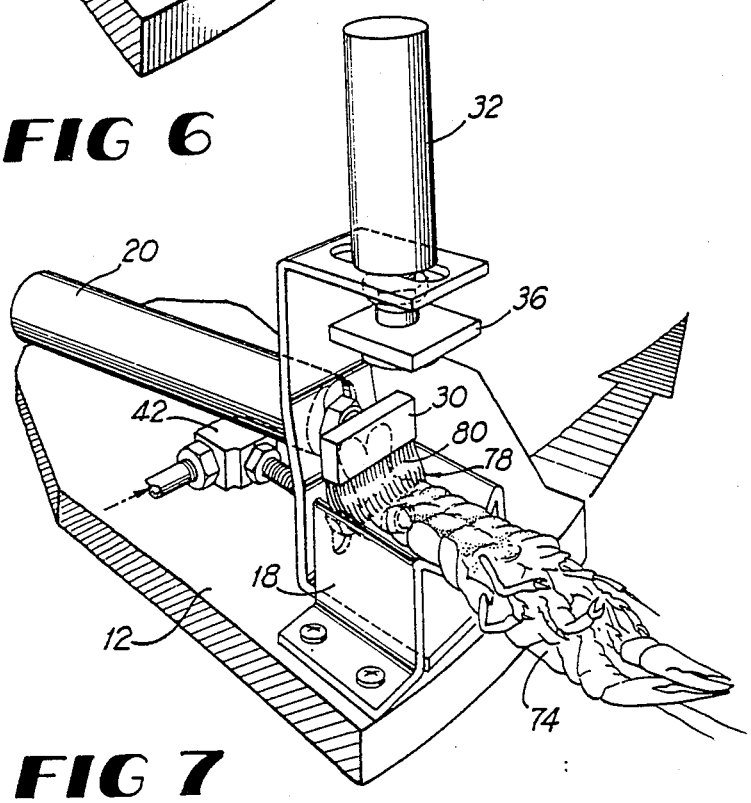

The tail of the crawfish tends to become curled upon cooking. As such, a necessary step in processing the cooked crawfish is straightening its tail so the meat can be accessed. A crawfish is first placed on the guide means 18, tail first and dorsal side down at load station A. The head and abdominal portions of the crawfish should extend beyond the guide means 18 and into the table 16. During this loading, the first air-cylinder 20 is activated and the brush 30 is extended outwardly towards the head of the crawfish 76, as seen in FIG. 6. Preferably, the tip 78 of the bristles 80 rubs lightly across the base of the guide means 18 and are angled about 20° off center. The first air-cylinder 20 then retracts the brush 30, which in turn uncurls and finally holds the tail relatively horizontal, as seen in FIG. 7. The bristle 80 stiffness of the brush 30 should be such as to pull and hold the tail back but not force the crawfish out of the operator's hand. This brush 30 mechanism compensates for the difference in sizes found in crawfish, particularly late in the season.

Figure 8:
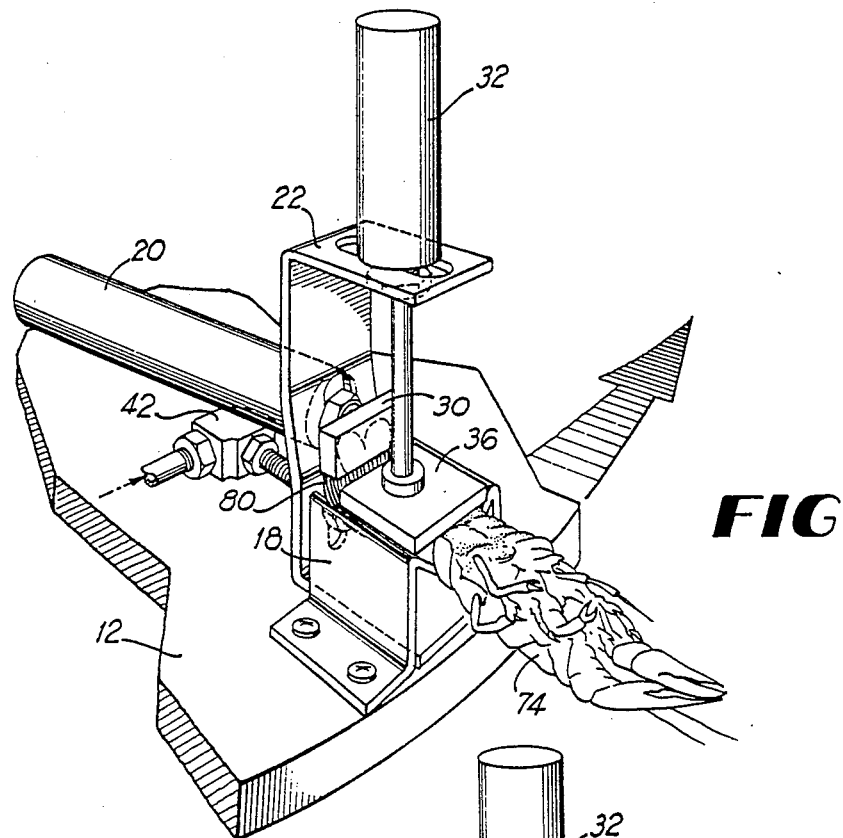

After loading, the plate 12 rotates counter-clockwise about 60° to station B, where the second air-cylinder 32 is activated and the block 36 of the pressure applying means is lowered onto a crawfish, as shown in FIG. 8. Such pressure, as stated above, acts to center the crawfish flatly on the guide means 18 and also acts to cause the nozzle tip 44 to enter the crawfish.

Figure 5:
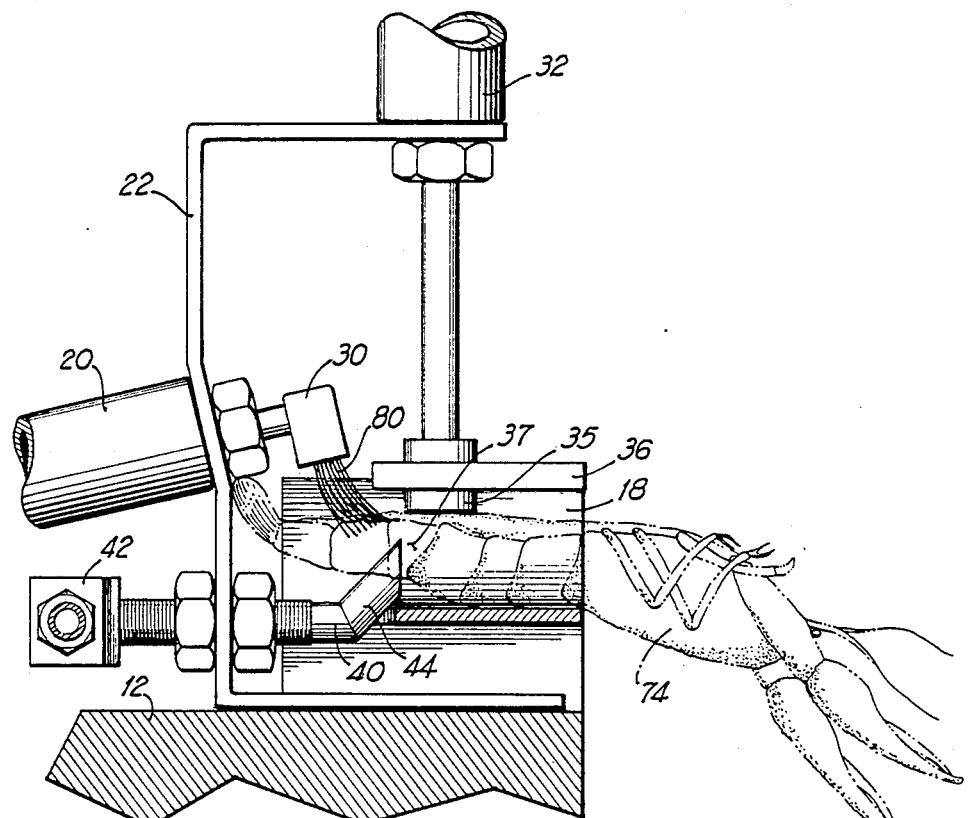
FIGS. 5-11 are views of the various stages in the processing of peeling a crustacean using the method and device of the present invention.

The tail of the crawfish must be properly centered for impingement by the nozzle tip 44 before it can be efficiently demeated. To achieve this, the nozzle tip 44 is located at the base of the 85° V-shaped guide means 18. Such design results in the automatic centering of the crawfish even when they are placed into the holder up to ±15° off center. When the foot 35 of the block 36 of the pressure applying means contacts the crawfish, the position of the crawfish shifts in the guide means 18 until it is properly centered. Thus, impingement occurs at the proper horizontal position for maximum demeating efficiency. For illustrative purposes, FIG. 5 depicts a crawfish 74 held onto a guide means 18 by the foot 35 so that the nozzle tip 44 of the meat ejection means is properly positioned in the first segment 37 after the tail of the crawfish.

The nozzle tip 44 is aimed at an approximately 30° to 45° angle above the plane of the tail to provide a sharp, well-defined point of impingement and to reduce the problem of the tail sliding off center during clamping. As will be discussed below, this orientation also results in a high percentage of automatic deveining.

Figure 9:
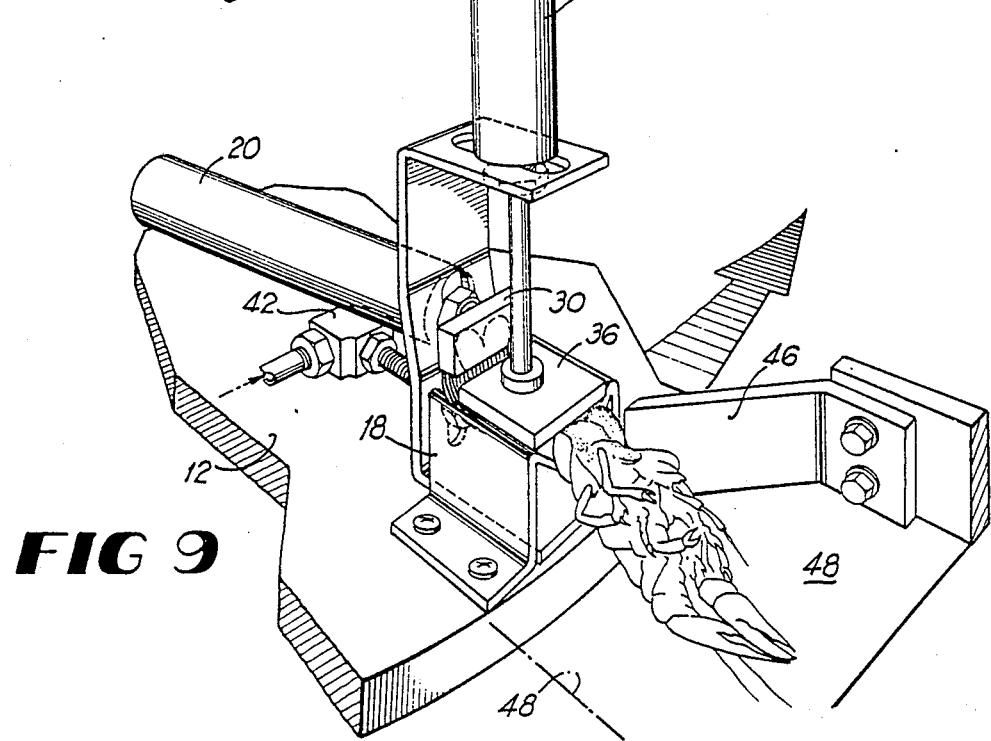

Maximum meat-removal efficiency is obtained by impinging the first or second shell segment from the tailfin. Demeating efficiency drops when the third or subsequent shell segment is used as the point of impingement. Therefore, it is advised that the tail be properly centered horizontally and the crawfish positioned on the guide means 18 such that the tail fin ends up about 1/16 in. beyond the nozzle 40 when extended. It is also preferable that the crawfish be held horizontal (tail up) or at an angle of 10° relative to horizontal during loading The deheading function occurs at station C of FIG. 1, which is approximately 90° along the path of travel of the plate 12. As seen in FIG. 9, deheading is performed by a snapping action created by moving the crawfish into a stationary element 46. It is preferable that the crawfish meets the element 46 at an angle, such as in the case of the curved element 46 shown in FIG. 9. The impact of the element causes the head and abdomen to flex and break at the uppermost point, leaving only attachment at the top of the thorax, and finally snaps off the head and abdominal portions into the trap 48. The snapping action is very efficient because the tail meat and fat protruding into the head are retained with the tail section. Furthermore, none of the head section is left with the tail to interfere with demeating. The snapping action may be obtained by a vertical force which bends the head downward, or a horizontal force as shown in FIG. 9.

Figure 10:
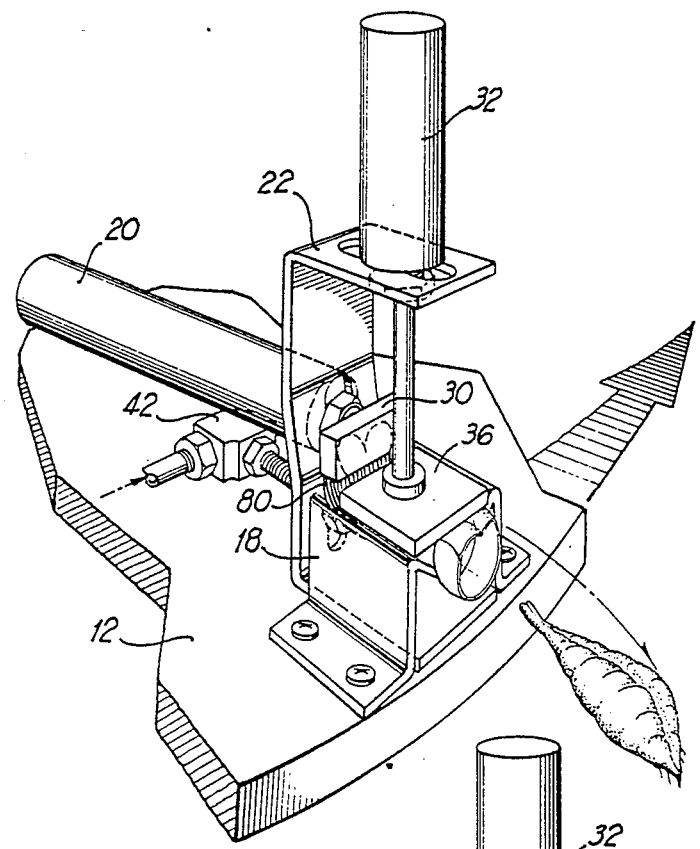
Figure 11:
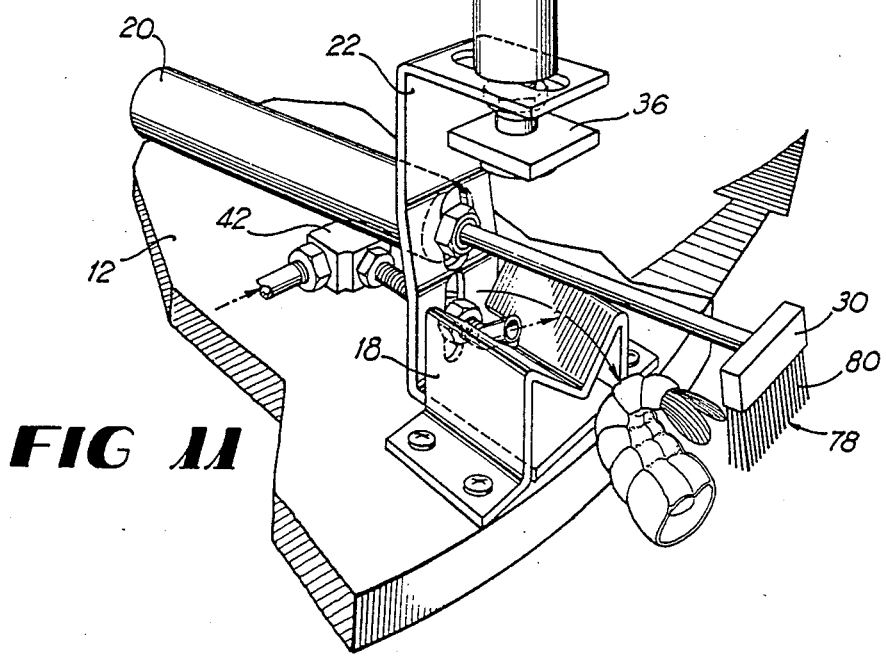

The demeating function occurs at station D, which is approximately 180° along the path of travel of the plate 12. A blast of fluid, preferably clean air, is delivered from the nozzle 40 into the meat. For best results, pressure of at least 80 psig, channeled through ⅛-inch.-O.D tubing) is recommended. The amount of air pressure for ejecting the meat is also somewhat dependent on the degree of pressure exerted by the block 36. The air forces the meat out of the shell, as shown in FIG. 10, so that the meat can be collected The shell remains held in place on the guide means by the block 36 of the still activated means for applying downward pressure.

It has been found that crawfish meat which have been degraded (e.g. the crawfish is dead prior to cooking, freezer burned, or stored for prolonged periods after cooking) fall apart during the application of the fluid, and segments remain in the tail shell. This failure to eject is because such meat is usually dehydrated, and the air stream channels through the shell without ejecting the degraded meat. This ensures that only high-quality meat will be collected.

Also, to be commercially acceptable, processed crawfish tails must be deveined. The air delivered during the demeating function of the present invention is forced into the tail away from the vein. As such, the vein and the strip of meat covering it usually remain attached to the shell during the ejection process.

The shell ejection process occurs at station E of FIG. 1, approximately 240° along the path of travel of the plate 12. At this point E, the block 36 is raised and a second blast of air is then delivered through the nozzle 40, and the shell is blown off the guide means 18. The brush 30 is then again extended forward. Any shell fragments left on the guide means 18 are removed by the extension of the brush 30. After the shell is ejected, the set of components returns to the loading station A, and the process is repeated.

Also, a number of sets of components may be placed on the plate 12, such as the four shown in FIG. 1. This enables a number of crawfish to be processed simultaneously, each at a different step in the process. For example, as a first crawfish is being loaded at station A, a second is being deheaded at station C, a third is having its meat ejected at station D, and an empty set of components, ready to receive a crawfish, is approaching station A from station E.

While the embodiments of the invention has been set forth in association with the preferred embodiment described herein, it will be understood that variations and modifications can be effected within the spirit and scope of the method and apparatus of the invention as described herein before and as claimed.

What we claim is:

1. A method of mechanically removing the meat from a crustacean, comprising the steps of:
   a. loading the tail of said crustacean onto a guide means, dorsal side down;
   b. extending said tail so said tail assumes a substantially horizontal position;
   c. piercing said tail with the tip of a nozzle connected to a source of pressurized fluid;
   d. separating the head and abdominal portions of said crustacean from said tail; and
   e. expelling said meat from said tail by means of said pressurized fluid from said tip impinging on said meat.

2. A method as claimed in claim 1, wherein said extending step comprises the step of applying a force to said tail opposite said dorsal side along the length of said tail towards the end of said tail so that said tail is uncurled.

3. A method as claimed in claim 1, wherein said extending step comprises the step of moving a brush means along said tail opposite said dorsal side from the front of said tail to its rear.

4. A method as claimed in claim 3, and further comprising the step of maintaining said tail in said horizontal position prior to said piercing step.

5. A method as claimed in claim 1, whereby said piercing step is accomplished by applying downwardly directed pressure to said tail opposite said dorsal side so that said dorsal side is urged upon said tip.

6. A method as claimed in claim 1, wherein said separating step comprises the step of advancing said crustacean along a path of travel between said piercing and said expelling steps and further comprising the step of introducing an obstacle in said path of travel to engage said head and abdominal portions so as to remove said portions from said tail.

7. A method as claimed in claim 1, and further comprising the step of ejecting said tail from said guide means after said expelling step.

8. A method of mechanically removing the meat from the tail of a crustacean which has had its head portion removed, comprising the steps of:

a. uncurling said tail so that it assumes a substantially extended position;
b. penetrating the dorsal side of said tail with a piercing means connected to a source of pressurized fluid; and
c. applying said pressurized fluid to said meat within said tail through said piercing means so as to expel said meat from said tail.

9. A method as claimed in claim 8 and further including the step of placing said tail in a guide means prior to said uncurling step 10. A method as claimed in claim 9 and further including the step of ejecting said tail from said guide means after said applying step.

11. A method of processing crustaceans, comprising the steps of:
a. presenting a crustacean to a guide means at a first station;
b. uncurling the tail of said crustacean at said first station while concurrently loading said extended tail onto said guide means;
c. advancing said crustacean to a second station;
d. piercing the dorsal side of said tail with a piercing means connected to a source of pressurized fluid;
e. moving said crustacean to a third station;
f. separating said tail from the remainder of said crustacean between said second and third station;
g. applying said pressurized fluid through said piercing means to the meat within said tail so as to expel said meat from said tail at said third station;
h. advancing said tail to a fourth station;
i. ejecting said tail from said guide means at said fourth station; and
j. moving said guide means to said first station.

12. A method as claimed in claim 11 and further comprising the steps of applying a downwardly directed pressure to said tail concurrently with said piercing step and removing said pressure on said tail prior to said ejecting step.

13. A device for processing crustaceans, comprising:
a. a housing;
b. support means rotably mounted on said housing;
c. means for rotating said support means;
d. guide means on said support means for receiving therein said crustacean, dorsal side down;
e. means on said device for uncurling the tail of said so that said tail assumes an extended position;
f. nozzle means connected to a source of pressurized fluid, said nozzle means having a tip thereon which projects into said guide means;
g. means on said device for applying a downward pressure to said extended tail so that said nozzle tip pierces said tail; and
h. means associated with said device for separating the body portion of said crustacean from said tail.

14. A device as claimed in claim 13, wherein said housing is cylindrical in shape and has a top periphery and wherein a flange surface extends about said top periphery.

15. A device as claimed in claim 14, wherein said support means comprises a plate having an upper surface.

16. A device as claimed in claim 15, wherein said upper surface of said plate is positioned below said flange surface on said housing.

17. A device as claimed in claim wherein said guide means comprising a rigid, V-shaped element and wherein said nozzle tip extends upwardly from the bottom of said element.

18. A device as claimed in claim 17 wherein said nozzle tip extends at an angle of approximately 30° to approximately 45° from the upper surface of solid plate.

19. A device as claimed in claim 18, wherein said V-shaped element receives said tail of said crustacean and wherein said body portion of said crustacean is received on said flange surface, said body portion defining a path of travel along said flange surface as said support means is rotated.

20. A device as claimed in claim 17, wherein said uncurling means comprises a brush having downwardly extending bristles which engage said tail opposite said dorsal side, said brush rearwardly movable from an inoperative position adjacent the connection between said tail and said body portion along the length of said tail to an operative position adjacent the end of said tail and wherein said device further comprises means for moving said brush between said inoperable and said operable positions.

21. A device as claimed in claim 18, wherein said uncurling means is carried on said plate.

22. A device as claimed in claim 17, wherein said pressure applying means is on said plate.

23. A device as claimed in claim 19, wherein said separating means comprises a stationary element in said path of travel which engages said body portion so as to sever said body portion from said tail as said support means is rotated.

24. A device as claimed in claim 23, wherein said element is on said flange surface.

25. A device for processing the meat from a tail severed from a crustacean, comprising:
a. a frame;
b. a plate rotably mounted on said frame;
c. means for rotating said plate;
d. guide means on said plate for receiving therein said tail;
e. means on said plate for uncurling said tail, whereby said uncurled tail is loaded onto said guide means;
f. means on said guide means for injecting an effective amount of pressurized fluid into said tail so as to eject said meat therefrom;
g. a source of pressurized fluid connected to said injecting means; and
h. means for selectively actuating said uncurling means and said injecting means in a timed sequence.

26. A device as claimed in claim 25, and further comprising pressure means on said plate movable between an operative position wherein said tail is urged onto said injecting means prior to said injecting means injecting said fluid into said tail and an inoperable position wherein said urging means is removed from said tail after said meat is ejected therefrom, said device also further comprising means connected to said actuating means for moving said pressure means between said operable and inoperable positions in said time sequence.

* * * * *